Figure 9:
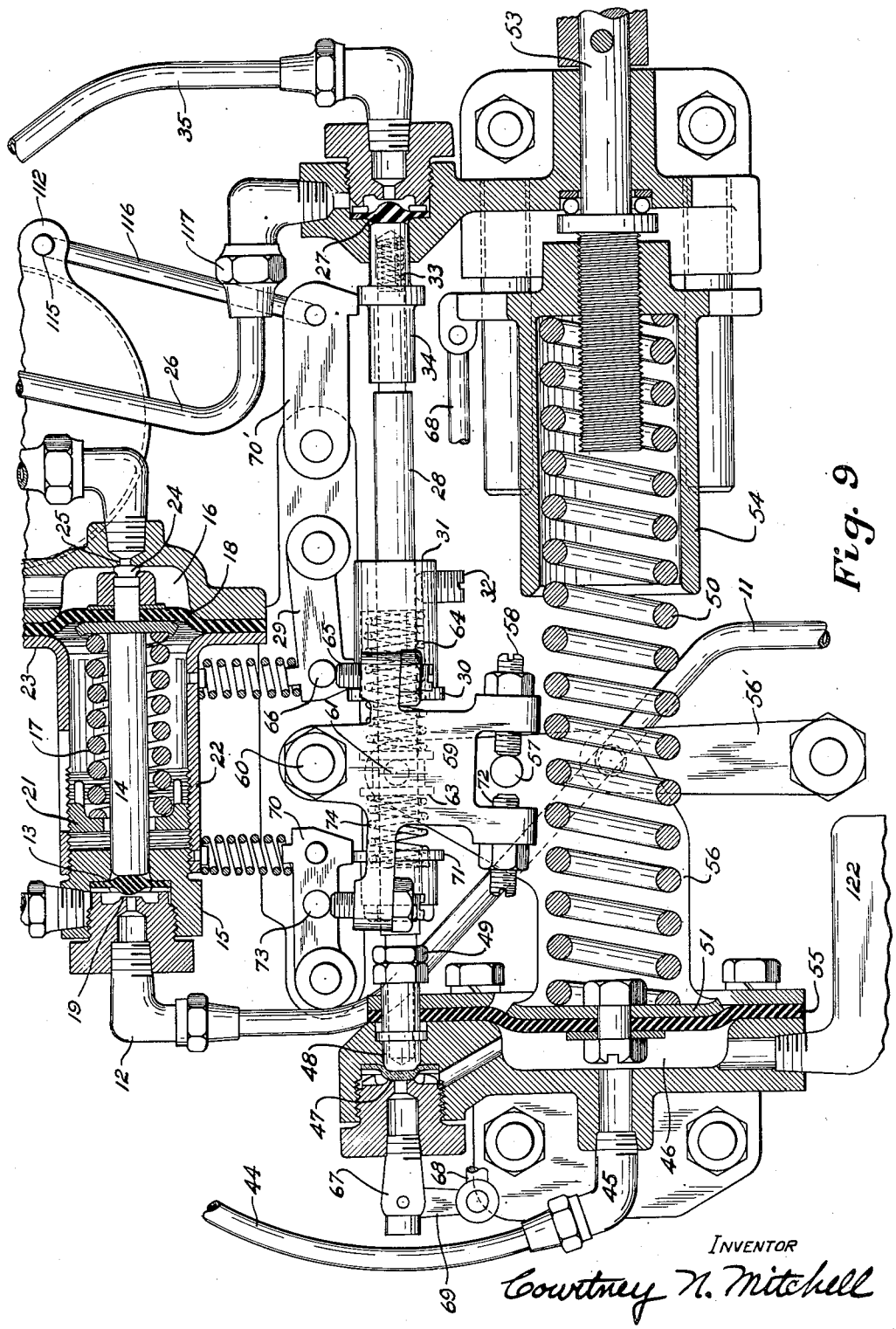

Dec. 26, 1939.   C. N. MITCHELL   2,184,895
FLUID METER AND CYCLE OF OPERATION OF SAME
Original Filed July 15, 1935   3 Sheets-Sheet 1
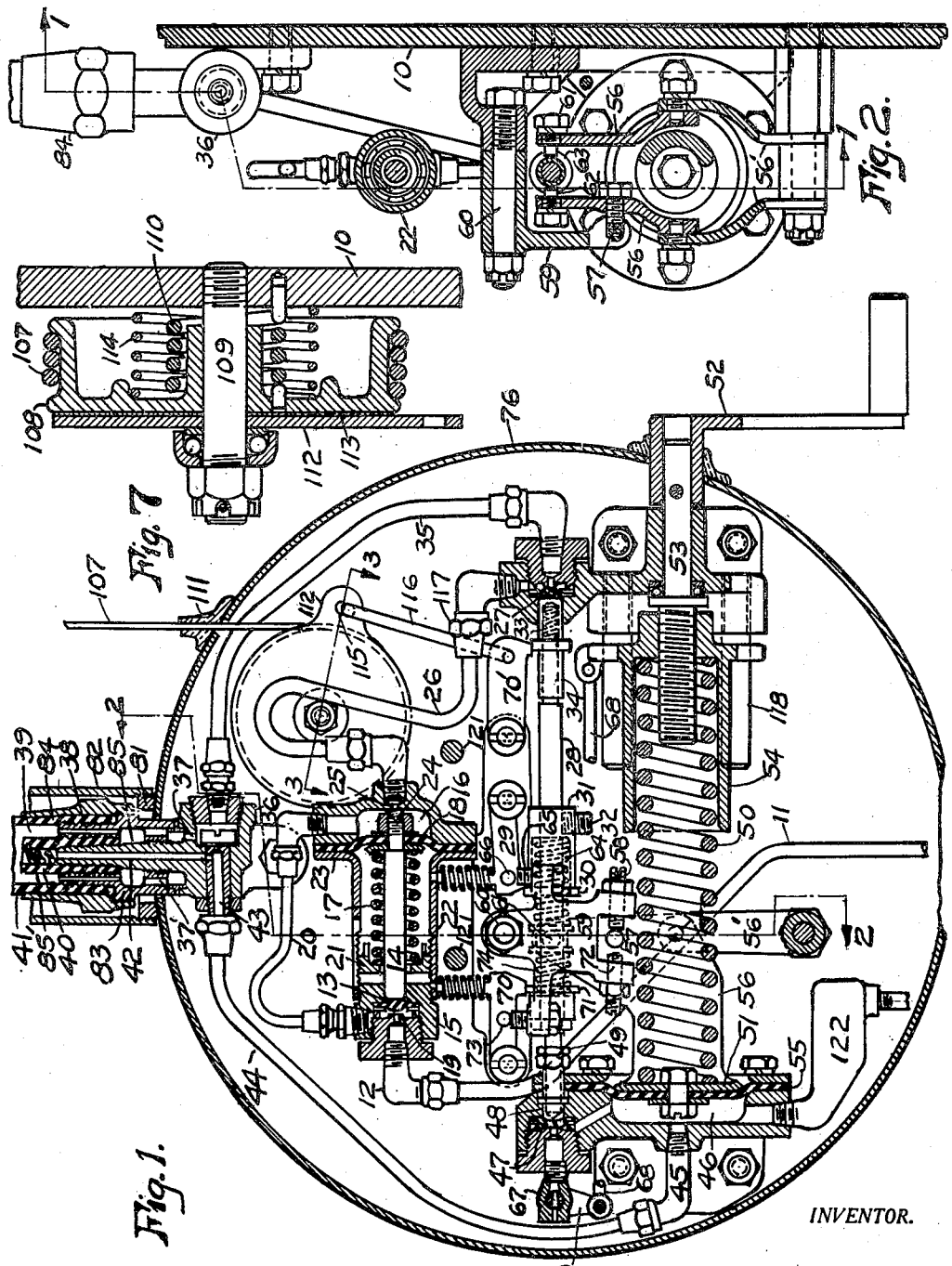
INVENTOR.
Courtney N. Mitchell Dec. 26, 1939.    C. N. MITCHELL    2,184,895
FLUID METER AND CYCLE OF OPERATION OF SAME
Original Filed July 15, 1935    3 Sheets-Sheet 2
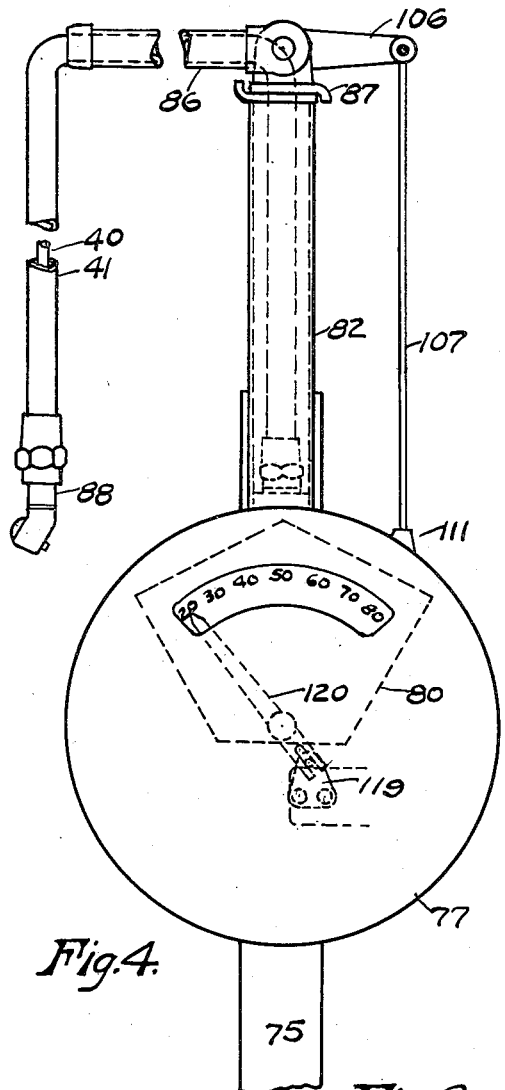
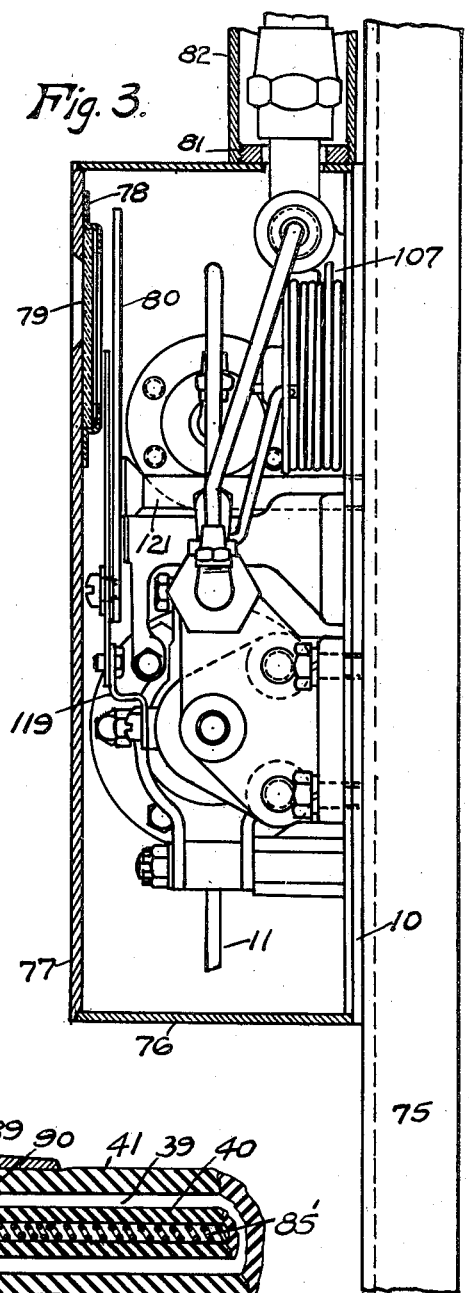
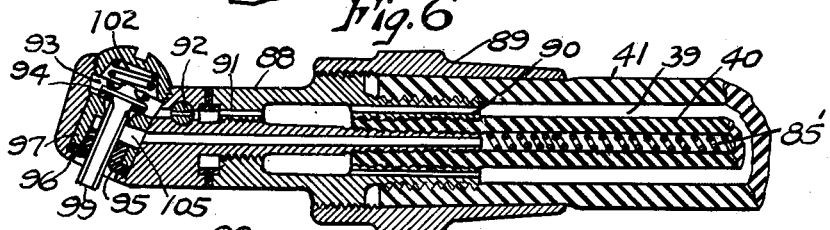
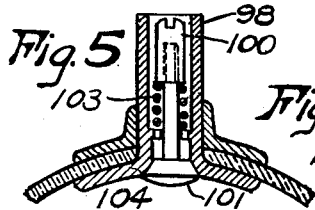
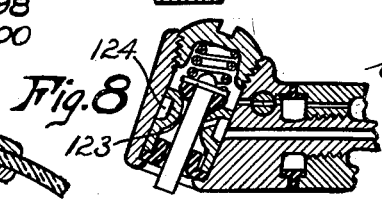
INVENTOR.
Courtney N. Mitchell Patented Dec. 26, 1939

2,184,895

UNITED STATES PATENT OFFICE 2,184,895

FLUID METER AND CYCLE OF OPERATION OF SAME

Courtney N. Mitchell, Strongsville, Ohio

Application July 15, 1935, Serial No. 31,389
Renewed May 23, 1939

33 Claims. (Cl. 221—73.5)

This invention relates to a fluid metering device and is intended primarily for regulating the flow of air or other gases from a reservoir or source under one condition of pressure into a receiver at a lower pressure. One of its most advantageous applications is found in the metering of air for the inflation of pneumatic tires. In the air meters now generally employed the construction provides for intermittent or oscillatory operation whereby the pressure in the receiver is increased by increments. The oscillatory movement of the mechanism continues until the desired pressure or a little more than the desired pressure is obtained at which time the pressure in the line leading to the receiver prevents the opening of the supply valve. This oscillatory operation of the device not only causes wear and loosening of the structure but permits of over-inflation by the repeated applications of the hose nozzle to the receiver which may have already been completely filled. Further, these devices do not permit of automatically reducing the excess pressure which may have been attained by this or other means.

The chief object of this invention is to eliminate the disadvantages above stated by providing an instrument in which repeated oscillations do not occur during the inflation of any one receiver causing wear and loosening of the structure, and one which will automatically reduce the pressure in an over-inflated receiver without resorting to any operations other than those for increasing the pressure. Another object is to provide a metering device which can be adjusted readily for the pressure desired in the receiver and one which is not affected by variations of the pressure of the source. A further object is to provide a device which will prevent the loss of fluid from the source while the instrument is not in operation. A still further object is to provide a device of neat appearance, of convenience in use, inexpensive installation and of reasonable manufacturing cost. To the accomplishment of the foregoing and related ends, said invention, then, consists of the means illustrated in the accompanying drawings, described in the following specification and more particularly pointed out in the appended claims.

The annexed drawings and the following description set forth in detail certain mechanism embodying the invention, such disclosed means constituting, however, but one of various mechanical forms in which the principle of the invention may be used.

In said annexed drawings Fig. 1 is a view partly in section on line 1—1 of Fig. 2 and partly in elevation, the tubes, rods and valve operating mechanism being in elevation. Fig. 2 is a section on line 2—2 of Fig. 1 but with the housing and cover mechanism removed. Fig. 3 is a side elevational view of the operating mechanism and supporting plate, but with the adjusting crank removed and showing the housing and cover mechanism in section. Fig. 4 is an external elevational view of the air meter with the hose supporting structure including the tower arm attached thereto. Fig. 5 is a sectional view of the valve attached to the receiver. Fig. 6 is a sectional view of the nozzle end of the double hose structure. Fig. 7 is a section on line 3—3 of Fig. 1 showing only the mechanism for operating the latch of the high pressure valve and the tower arm. Fig. 8 is a fragmentary section of a modification of the nozzle shown in Fig. 6. Fig. 9 is an enlarged view of the central portion of Fig. 1.

Referring now more specifically to Figs. 1, 2, 3, 9 and 10 is the supporting plate or base on which the principal elements of the device are mounted. The air from the source under pressure is received through tube 11 and is delivered through connection 12 to valve 13 which is actuated by plunger 14 passing through valve body 15. By a reduction of pressure in chamber 16 the spring 17 deflects diaphragm 18 to which plunger 14 is attached. By the movement of this plunger, valve 13 is permitted to leave its seat 19 under the pressure of the air from line 11 and the air thus passes over into chamber 16 through tube 20. When the pressure in chamber 16 has increased to a predetermined amount, depending on the adjustment of spring 17, this pressure, acting on the diaphragm 18, compresses spring 17 and closes valve 13. The tension of spring 17 is regulated by the adjustable spring seat 21 which is threaded into the tubular extension 22 of the diaphragm clamp ring 23. The pressure in chamber 16 is thus prevented from exceeding a definite amount.

In event the pressure in tube 11 be reduced below that required to operate the metering mechanism hereinafter described, valve 13 will remain open and the air under reduced pressure will pass into chamber 16, which, not being sufficient to support diaphragm 18 against the pressure of spring 17, will permit the end of plunger 14 carrying valve 24 to engage the opening 25 leading to tube 26 and the mechanism will thus be maintained in an inoperative condition until an increase of pressure is supplied to tube 11.

When sufficient pressure is available to maintain valve 24 in open position, the air under the predetermined limits of pressure will pass through tube 26 to valve 27 which is held open during the period of inflation by the air pressure acting thereon and is prevented from being closed through any movement of valve rod 28 by the latch 29 engaging collar 30 of spring seat 31 and which is secured to valve rod 28 by set screw 32. The small spring 33 within valve tappet 34 is sufficiently light to be deflected by the air pressure acting on valve 27 but is of sufficient strength to furnish the necessary force for the movement of valve rod 28 as hereinafter explained.

With valve 27 in open position, the air is permitted to pass out through tube 35 into hose terminal 36. From hose terminal 36 it passes through ports 37 and 37' and through port 38 into the annular space 39 between inner hose 40 and outer hose 41. The annular space 39 conducts the air to the nozzle attached to the terminal at the opposite end of the hose which is shown in Fig. 6 and which is hereinafter described. The space within the nozzle attached to the receiver becomes substantially a part of the receiver when the valve of the receiver is open. The receiver is ordinarily the inner tube of a pneumatic tire and the valve is the ordinary tire valve. The pressure in the receiver, or some proportional part thereof depending on the condition of the valve of the receiver, is transmitted through the inner hose line 40, the passage 42 and hollow bolt 43 into tube 44 which leads through fitting 45 into chamber 46. Valve 47 which controls the outlet of chamber 46 is maintained in closed position during the inflation of the receiver by plunger 48 which is supported in adjusted position on the end of rod 28 by nuts 49, the end of the rod having sliding clearance in the plunger 48. The latch 29 engaging collar 30 thus maintains valve 27 in open position and valve 47 in closed position while inflation takes place. The chamber 46, thus being connected with the receiver, will be subject to the changes of pressure in the receiver. Due to restrictions usually present in the valve at the inlet of the receiver, which ordinarily is the tire valve, and which becomes defective from the deterioration of the material in the valve or in its seat, there is often a difference of several pounds in the pressures existing in the receiver and in chamber 46. To compensate for this difference, the pressure of spring 50 bearing on seat 51 is so regulated by crank 52 operating shaft 53 and spring seat 54, that the diaphragm 55 closing chamber 46 must be subjected to considerable excess internal pressure before the diaphragm is deflected sufficiently to operate the latch mechanism connected therewith. When the necessary excess pressure has built up in chamber 46 during the inflation of the receiver, the seat 51 carrying arms 56, which are pivoted to and guided by radius arms 56', has moved axially and compressed spring 50 sufficiently to cause pin 57 carried by arms 56 to contact with screw 58 and rotate lever 59 on its support pin 60. While arms 56, by their movement, are rotating lever 59, the pins 61 and 62 also carried by arms 56 and engaging sliding collar 63 on rod 28 compress spring 64 building up pressure therein. At the instant the proper pressure has been attained in chamber 46 the latch 29 is released from its engagement with collar 30 by screw 65 carried by lever 59 engaging pin 66 of latch 29. The pressure of spring 64, suddenly released, carries rod 28 to the right closing valve 27 and permitting the pressure in chamber 46 to open valve 47. The air in chamber 46 and in all lines connected thereto, is permitted to drain through valve 67. The rate of drainage through valve 67 is controlled by the rod 68 connected at one end to the arm 69 of valve 67 and at its other end to spring seat 54. During this period of drainage, the valve rod 28 is held by latch 70 engaging collar 71 thus preventing it from moving in a direction to close valve 47. Simultaneously with the movement of latch 70 to engage collar 71 latch 70' engages the collar on valve tappet 34 and holds valve 27 in its closed position. While drainage from chamber 46 and all its connected spaces including the inner hose line 40, the space within the valve of the receiver and the receiver itself is taking place, the arms 56 move backward under the pressure of spring 50 rocking the lever 59 on its axis by means of pin 57 engaging pin 72. At the instant correct pressures have been attained in chamber 46 and the receiver connected thereto, latch 70 is released from engagement with collar 71 by the screw on lever 59 engaging pin 73. The tension of spring 74 which has been built up by the return movement of pins 61 and 62 engaging collar 63, is thus suddenly released and this tension together with the tension of spring 33 causes the valve rod 28 to move quickly to the left closing valve 47. Latch 70, again engaging collar 71, holds this valve in its closed position and the cycle of operation is thus completed with both valves 27 and 47 closed.

Referring now to Figs. 3, 4, 5, 6 and 7 and which relate more particularly to the hose and its method of operation and attachment and to the general use of the entire unit, it will be seen that the supporting plate 10 carrying the operating mechanism and its enclosing structure, is attached to the post or channel 75. The cylindrical housing 76 is supported at one end by the plate 10 as shown and at the other carriers the cover 77 which in turn carries the flange 78 holding the glass 79 through which the dial plate 80 becomes visible. The threaded ring 81 is welded to the top of the housing 76 and supports the tubular tower column 82. The supporting channel 75 is extended upwardly to provide an additional means of securing the tower column whenever an installation requires additional strength.

The hose lines are carried within the column 82 and are attached at their lower ends to the hose terminal 36 as shown in Fig. 1. The outer hose 41 is threaded over the end of terminal extension 83, the threads being of round contour to prevent cutting the rubber and fabric of the hose. The sleeve nut 84, when screwed into place on extension 83, has an internal tapered form which firmly clamps the end of the hose over the terminal extension. The stem 85 of the terminal is provided with a thread of round contour at its tapered end and a straight thread of the same pitch on the portion where it is screwed into the extension 83. When this stem 85 of the terminal is screwed into place, the tapered portion expands the inner hose into the inner threaded wall of extension 83. The clamping effects of sleeve nut 84 and the tapered stem 85 provide air tight joints which prevent leaks under any ordinary pressures from one hose into the other or into the surrounding atmosphere. As the pressure in the space 39 between the hose lines may be sufficient to collapse an inner hose of ordinary construction, a reinforcement in the form of a long helical spring 85' is inserted within the hose 40 to support its walls.

With the inner ends of the hose lines thus concentrically attached to the hose terminal 36 and extension 83, these lines pass upwardly through the column 82 and into tubular member 86 hingedly attached to the swivel top 87 carried by column 82. The hose passing out of the outer end of the tube 86 is of sufficient length to reach the valve of the tire or other receiver as shown in Fig. 5. The outer end of the hose line is provided with a nozzle or valve as shown in Fig. 6 and is adapted to engage the valve mechanism of the receiver. The construction of the hose clamping elements is substantially the same at this end as at the inner end of the hose, the nozzle extension 88 being the same as the terminal extension 83 and the sleeve nut 89 being the same as sleeve nut 84. The air under pressure in space 39 between the inner and outer hose lines passes ports 90, port 91 and orifice 92 into chamber 93 over the valve 94 in the nozzle. The orifice 92 is provided in a separate piece, such as a taper pin, which may be removed and replaced by another piece having an orifice of different size. When the nozzle is applied to the receiver, the rubber thimble 95, held between nozzle body flange 96 and liner 97, contacts with an air tight joint on the top of valve stem tube 98. The end of the stem 99 of valve 94 engages the end 100 of the receiver valve 101 and the pressure necessary to cause the thimble 95 to seat on the valve stem tube 98 opens both valve 94 and 101 against the pressure of springs 102 and 103 respectively and the air pressures already existing back of them. The stem 99 is provided with axial flutes to serve as passages for the air between the stem and the rubber thimble 95. When both valves 94 and 101 are held open, the space 104 within the receiver is connected directly with and substantially becomes a part of the space 105, the only limitation to this condition being the restrictive action of valve 101 which often occurs from corroded or otherwise affected conditions of the valve itself or its seat as already mentioned above. The orifice 92 is of suitable size to permit substantially the entire drop in pressure to take place therein and thus avoid a further drop in pressure between this orifice and the receiver. This orifice or an additional one may be located in the port 37 of hose terminal 36. The space 105 being in direct communication with the interior of the inner hose 40, the pressure therein is transmitted to the diaphragm chamber 46 as already explained.

As valve 27 is held in its closed position by latch 70' after the completion of the cycle of inflation, means must be provided for releasing this latch before the mechanism can again be used. For this purpose the release structure shown in Fig. 7 is provided. The tubular member 86 hinged at the top of column 82 has an extending arm 106 shown in Fig. 4 which is connected by means of the cable 107 to the drum 108 of this release structure. The drum 108 is free to rotate on stud 109 and is constrained angularly by spring 110. When the hose and its supporting tube 86 are moved downwardly the arm 106 moves upwardly pulling the cable 107 through the sealing flange 111 and rotating the drum in a direction to tension the spring 110. When the hose is released the spring will reverse the motion of the drum and will thus raise the outer end of tubular hose support 86. Rotatably mounted on stud 109 is plate 112 which is in frictional contact with the drum through friction facing 113. The spring 114 provides the frictional pressure which may be provided also by the suitable axial compression of spring 110. Plate 112 is provided with an extension having an elongated opening 115 which engages latch rod 116 as shown in Fig. 1. By means of a comparatively small movement of the hose tube 86 the cable 107 will rotate the drum 108. By the frictional engagement of the drum with plate 112, the latter is moved in a direction to release the latch 70' by means of rod 116. The latch is limited to a very small movement by contacting with a stop provided in the tube coupling nut 117. A further movement of the drum is permitted by the slipping of the friction surfaces at 113 without any further movement of the plate 112. In applying the nozzle to the receiver, the movement of the hose will cause a movement of drum 108 and plate 112 so as to leave the end of rod 116 free to move in the opening 115 which permits the latch 70' to operate.

From the above description it is apparent that the tension of spring 50 will determine the pressure in chamber 46 at which the valves operate. Therefore, for the purpose of adjusting this device for any desired and predetermined pressure, the crank 52 rotates shaft 53 and advances the spring seat 54 by means of its threaded engagement with the shaft. The spring seat is prevented from rotating by means of the studs 118 engaging openings provided in the flange 118' of the spring seat. This spring seat is made with a deep tubular portion for guiding the spring. On the outer wall of this tubular portion is a pair of bosses to which the off-set triangular plate 119, indicated in Fig. 4, is bolted. A pin provided in plate 119 engages the slotted end of dial pointer 120. This dial pointer is rotatably mounted on a pin carried by dial plate 80 which in turn is supported on studs 121 attached to base plate 10. As spring seat 54 moves axially the dial pointer is thus rotated across the dial provided as a part of dial plate 80 and which is visible through glass 79 in cover 77 as above indicated.

Considerable moisture is often present in the air entering the diaphragm chamber 46 and for that reason a trap 122 is attached at its lowest point by means of which the water condensed in the mechanism is collected and automatically drained out.

As may be understood readily from the preceding description, the device works on the principle of over inflating the receiver by a small amount in order to be assured that at least an amount equal to the desired pressure has been provided therein and then draining out this excess, the excess pressure being required to compensate for the variations in resistance to flow and the resulting pressure drops in the passages, especially in the valve of the receiver. There being a lack of uniformity in the resistance to flow in the connections for various receivers, the device is adjusted to provide sufficient excess pressure for the most unfavorable conditions, in which cases substantially no drainage of the receiver will occur, but a material amount of drainage will take place in cases of favorable conditions of flow.

*Operation*

When the hose line suspended to tower arm 86 is moved downward slightly toward the receiver, arm 106 rises sufficiently to cause cable 107 to rotate drum 108 enough to release latch 70' by the connection of plate 112 and rod 116. Latch 70' being limited in its movement by coupling nut 117, drum 108 continues to rotate with the movement of arm 106 tensioning spring 110 which will reverse the movement of the drum when the hose is released thus overcoming the small amount of friction provided at 113 and returning the arm 106 to its normal position and simultaneously rocking the plate 112 as far as the elongated opening 115 engaging the end of rod 116 will permit. Valve 27 thus being opened by the release of latch 70' air passes to the nozzle through the tube 35 and its connections to outer hose 41. When the nozzle is applied to the valve of the receiver the interior of the receiver is put into substantially open connection with the space 105 within the nozzle. The air flowing through the orifice 92 fills this space and the receiver connected thereto as a single space except for the small amount of restriction to flow that may be offered by a defective valve in the receiver. When the pressure in the space 105 reaches an amount of about seven pounds in excess of the pressure desired in the receiver, this pressure being transmitted to the chamber 46 by the inner hose 40, the diaphragm 55 is deflected compressing spring 50, already adjusted for the desired pressure, and release latch 29 causing valve 27 to close and valve 47 to open. Latch 70' engages push rod 34 simultaneously with latch 70 engaging collar 71. The drainage of the seven pounds excess pressure from chamber 46 together with all lines connected thereto, including the receiver, now takes place during which spring 50 returns diaphragm 55 and the mechanism connected thereto sufficiently to release latch 70 and permit valve 47 to close at the instant correct pressure has been attained. The closing of valve 47 terminates the cycle of operation of the mechanism and any suitable signal device such as a bell, a light or a whistle may be connected and controlled by the last movement of the valve rod 28 or by the last movement of the diaphragm 55. With both valves 27 and 47 thus closed the mechanism becomes inoperative until the nozzle is moved toward another receiver.

It will be obvious that latch 70' with its operating mechanism may be omitted and that latch 70 will operate to control valve 27. However, if latch 70' is omitted and if the nozzle is not removed immediately from communication with the receiver when the drainage has terminated, inflation of the excess pressure will again start as with this arrangement valve 27 is opened simultaneously with the closing of valve 47. When valve 27 is thus left in open position, leaks of the high pressure air will occur if the valve 94 in the nozzle is imperfect.

In event the hose lines 40 and 41 are carried on a reel instead of on a tower as shown in Fig. 4, the clutch arrangement used in connection with pulley 108, or its equivalent, is connected to the reel drum or with some part associated therewith and latch 70' is operated thereby.

In case the receiver is already inflated to a pressure in excess of the amount desired when the nozzle is applied to it, the pressure in the receiver will be transmitted to chamber 46 through inner hose 40 and valve 27 will be closed immediately and valve 47 simultaneously opened. The drainage of all excess pressure will take place at once and when the pressure has been reduced to the amount for which the dial has been set, valve 47 will be closed and the operation of the device terminated as before.

The nozzle shown in Fig. 8 is substantially the same as that shown in Fig. 6, but provides for a greater difference in pressure between the delivery line and the back pressure line to the diaphragm chamber. The rapid flow of air through the throat of the venturi 123 causes a reduction in the pressure in the annulus 124 below that which would exist there were the passage of any other general form than that shown. In a modified form this venturi may be placed in the connection at the opposite end of the hose line or placed adjacent to the diaphragm chamber.

Various modifications in the use of parts of this device may be made to adapt it to any particular conditions which may exist. When inflating at high pressures a ball check valve is provided in fitting 45 which prevents sudden surges of air into chamber 46 from the receiver which result in premature movements of the diaphragm. This check valve is provided with a restricted passage to permit the necessary leakage to chamber 46 for the operation of the valve rod 28 while the check valve is on its seat, free flow through this valve occuring in the opposite direction.

When operating at medium pressures which vary but little between maximum and minimum values, the entire regulating valve mechanism in which spring 17 is used is omitted and the line 11 is then connected directly to sleeve nut 117.

In cases where the range of pressure in the receiver is not great and clean opening valves are provided in the receiver, the inner hose line 40 may be omitted and a suitable orifice provided instead of the port 37. The outer hose 41 then substantially becomes a part of the receiver during the period of inflation, the pressure therein being nearly that of the receiver itself. The low pressure line 44, then being connected to the interior of extension 83, transmits the pressure to chamber 46.

Other modes of applying the principle of my invention may be employed instead of the one explained, change being made as regards the mechanism herein disclosed, provided the means stated by any of the following claims or the equivalent of such stated means be employed.

I therefore particularily point out and distinctly claim as my invention:

1. In an air meter of the type described, a source of air under pressure, a primary valve connected to said source, supply piping connecting said primary valve with a receiver, drainage piping from said receiver to a secondary valve, a sliding bar, means actuated by an increase in pressure in the receiver to move the sliding bar whereby the primary valve is closed, means associated with said sliding bar for opening the secondary valve, and an adjustable spring associated with an air operated member to slide the sliding bar.

2. In an air meter of the type described, a source of air under pressure, a primary valve connected to said source, piping connecting said primary valve with a receiver, piping from said receiver to a secondary valve, means actuated by the increase of pressure in the receiver to close said primary valve, the said means being disposed to open said secondary valve, and adjustable means for regulating a flow of fluid through the secondary valve.

3. In an air meter of the type described, a source of air under pressure, a primary valve connected to said source, supply piping connecting said primary valve with a receiver, drainage piping from said receiver to a secondary valve, a sliding bar, means actuated by an increase in pressure in the receiver to move the sliding bar whereby the primary valve is closed, means associated with said sliding bar for opening the secondary valve, and a latch engaging a member on the bar for holding the primary valve closed.

4. In an air meter of the type described, a source of air under pressure, a primary valve connected to said source, supply piping connecting said primary valve with a receiver, drainage piping from said receiver to a secondary valve, a sliding bar, means actuated by an increase in pressure in the receiver to move the sliding bar whereby the primary valve is closed, air actuated means for opening the secondary valve, and a latch engaging an adjustable member on the sliding bar for holding the primary valve closed.

5. In an air meter of the type described, a source of air under pressure, a primary valve connected to said source, supply piping connecting said primary valve with a receiver, drainage piping from said receiver to a secondary valve, a sliding bar, means actuated by an increase in pressure in the receiver to move the sliding bar whereby the primary valve is closed, air actuated means for opening the secondary valve, and means associated with the sliding bar for closing the secondary valve.

6. In an air meter of the type described, a source of air under pressure, a primary valve connected to said source, supply piping connecting said primary valve with a receiver, drainage piping from said receiver to a secondary valve, a sliding bar, means actuated by an increase in pressure in the receiver to move the sliding bar whereby the primary valve is closed, means associated with the sliding bar for closing the secondary valve, and adjustable means on said sliding bar for holding the aforesaid valves closed.

7. In an air metering device, a source of air under pressure, high pressure piping leading from said source to a receiver, a primary valve in said high pressure piping, low pressure piping from said receiver, a secondary valve in said low pressure piping, means associated with said piping and said valves whereby the receiver is first inflated to an excess pressure and then drained to the desired pressure and means associated with the low pressure piping for adjusting the said desired pressure.

8. In a metering device, a source of fluid under pressure, supply piping leading from said source to a receiver, piping leading from said receiver to an adjustable chamber and means associated with said adjustable chamber to close the said supply piping and to successively open and close the piping from the receiver while the said supply piping remains closed.

9. In a fluid metering device, a supply line under pressure, a valve in said supply line, a drainage line, a valve in said drainage line, a chamber in said drainage line having a diaphragm, adjustable means for resisting the movement of said diaphragm, means associated with said adjustable means for operating one of said valves, and an element having connection with said supply line said element serving as means for opening the valve in the supply line, said element being independent of fluid pressure.

10. In a fluid metering device, a supply line under pressure, a valve in said supply line, a drainage line, a valve in said drainage line, a chamber in said drainage line having a diaphragm, adjustable means for resisting the movement of said diaphragm, means associated with said diaphragm for operating said valves, and an element having connection with said drainage line, said element serving as means for opening a valve, said element being independent of fluid pressure.

11. In a fluid metering device, a supply line under pressure, a pressure regulator therein, said regulator having one valve adapted to close against high pressure and a second valve adapted to close against low pressure whereby the pressure of the fluid passing through said line is maintained within limits, control valves for admitting air to a receiver, a control valve for draining the receiver, said control valves being operated by the pressure in the piping, and an adjustable means governing the opening and closing of said control valves.

12. In a fluid meter, a supply line under pressure, a pressure regulator therein, a primary valve in the supply line, said regulator being adapted to regulate fluid pressure at the primary valve, piping connecting the primary valve with a receiver, return piping from said receiver, valves in said supply line and said return piping from the receiver and adjustable means for controlling the opening and closing of said valves by the pressure from the receiver.

13. In a fluid metering device, a primary line under pressure, a valve in said primary line, a secondary line, a valve in said secondary line, a chamber closed by a diaphragm, an adjustable means resisting the movement of said diaphragm, means associated with the said diaphragm for operating the closure of said valves, a hose forming a part of said primary line, a support for said hose, and a means connected with said support for controlling the opening of the valve in said primary line.

14. In a fluid metering device, a primary line under pressure, a valve in said primary line, a drainage line, a valve in said drainage line, said valves being arranged at opposite ends of an operating rod, a chamber closed by a diaphragm, an adjustable spring resisting the movement of the diaphragm, means associated with said diaphragm whereby the valves in said primary and said secondary lines are operated substantially simultaneously, and means for determining the adjustment of the adjustable spring.

15. In a fluid metering device, a primary line under pressure comprising a hose, a valve in said primary line, a secondary line having a chamber closed by a diaphragm, a valve in said secondary line, adjustable means resisting a movement of the diaphragm, means associated with the diaphragm whereby said diaphragm operates to close the valves, locking means for the valve in the primary line, and means for releasing the locking means, said last named means comprising a moveable support for said hose having connection with a drum.

16. In a fluid metering device, a primary line under pressure, a valve in said primary line, a pressure hose line from said valve to a receiver, a return line from said receiver to a chamber having a diaphragm to operate the said valve, said pressure hose line and return line being arranged substantially concentric relative to each other, and means being provided for securing said hose lines at their ends in non-communicating relationship.

17. In a fluid metering device, having a primary line under pressure, a valve in said primary line, a pressure hose line from said valve to a receiver, and a return hose line from said receiver to a chamber having a valve operating diaphragm, means provided for securing said hose lines at their ends in non-communicating relationship, the said means consisting of substantially concentric threaded members.

18. In a fluid meter, a source of fluid under pressure, piping connecting said source with a receiver, a valve in said piping, a diaphragm actuated by excess pressure in the receiver to close said valve, diaphragm means actuated by said excess pressure in the receiver for opening a valve for draining the receiver, and means actuated by reduced pressure in the receiver to close said drain valve.

19. In a fluid meter, a source of fluid under pressure, piping connecting said source with a receiver, a valve in said piping, a diaphragm actuated by excess pressure in the receiver to close said valve, a diaphragm actuated by said excess pressure in the receiver for opening a valve for draining the receiver, and a diaphragm for terminating the period of draining.

20. In a device of the character described, a source of air under pressure, substantially parallel passages leading to a receiver, one of the passages serving as means for conducting air from the source to the receiver, a valve in the last named passage, another of the passages serving as means for conducting air from the receiver to a chamber, the air pressure in the chamber varying substantially with the pressure in the receiver, a valve in the passage from the receiver, both of said valves being actuated by pressure in the chamber, said pressure in the chamber being substantially in excess of pressure desired in the receiver, and the valve in the passage from the receiver being actuated by pressure in the aforesaid chamber when the said pressure in the chamber has been reduced substantially to that desired in the receiver.

21. In a device of the character described, piping from a source of air under pressure to a high pressure valve, a high pressure hose conducting air from the said valve to a tire, a low pressure hose conducting air from said tire to an expanding chamber, said chamber having a member connected with a rod, said rod being disposed to operate the aforesaid high pressure valve, and a drain valve, said drain valve controlling a flow of air for the expanding chamber.

22. In a device of the character described, a source of air under pressure, a conduit from said source to a high pressure valve, a supply conduit from the high pressure valve to a tire, a separate return conduit from the tire to a control chamber, a surge control valve in the return conduit, a spring regulating the volume of the control chamber, and means having an indicator for adjusting the spring.

23. In a device of the character described, a source of air under pressure, piping from said source to a high pressure valve, a supply conduit from the high pressure valve to a tire, a return conduit from the tire to a control chamber, the supply conduit and return conduit being combined into a single flexible line, a surge control valve in the return conduit, a spring regulating the volume of the control chamber, and means having an indicator for adjusting the spring.

24. In a device of the character described, a source of air under pressure, piping from said source to a high pressure valve, a supply conduit from the high pressure valve to a tire, a return conduit from the tire to a control chamber, a surge control valve in the return conduit, a spring regulating the volume of the control chamber, a moving element being controlled by said spring, a latch operating member being controlled by the moving element, the said moving element having connection with a member for controlling the aforesaid high pressure valve, and means having an indicator for adjusting the spring.

25. In a device of the character described, a source of air under pressure, piping from said source to a high pressure valve, a supply conduit from the high pressure valve to a receiver, a return conduit from the receiver to a control chamber, a release valve for the return conduit, means for regulating flow through the release valve, a spring regulating the volume of the control chamber, a moving element controlled by said spring and said control chamber, the said moving element having connection with a member for controlling the aforesaid high pressure valve and the aforesaid release valve, and means having an indicator for adjusting the spring.

26. In a device of the character described, a source of air under pressure, piping from said source to a high pressure valve, a supply conduit from the high pressure valve to a receiver, a return conduit from the receiver to a control chamber, a release valve for the control chamber, adjustable means for regulating flow through the release valve, resilient means for regulating the volume of the control chamber, a moving element being controlled by said resilient means, the said moving element having connection with a member for controlling a valve, and means for adjusting the resilient means to a predetermined pressure.

27. In a device of the character described, a source of air under pressure, piping from said source to a high pressure valve, a supply conduit from the high pressure valve to a receiver, a return conduit from the receiver to a control chamber, a valve in the control chamber, resilient means for regulating the volume of the control chamber, a moving element being actuated by said resilient means, the moving element having connection for controlling the aforesaid valves, and means for adjusting the resilient means to a predetermined pressure, the last named means comprising means for regulating flow through the valve in the aforesaid control chamber.

28. In a device of the character described, a source of air under pressure, a piping from said source to a high pressure valve, a supply conduit from the high pressure valve to a receiver, a return conduit from the receiver to a control chamber, a drain valve in the control chamber, resilient means for regulating the volume of the control chamber, a moving element being actuated by said resilient means, the moving element having a connection for controlling the aforesaid high pressure valve, and latch means for holding the aforesaid drain valve in closed adjustment.

29. In a device of the character described, a source of air under pressure, piping from said source to a high pressure valve, a supply conduit from the high pressure valve to a receiver, a return conduit from the receiver to a control chamber, a drain valve in the control chamber, resilient means for regulating the volume of the control chamber, a moving element being actuated by the resilient means, the moving element having a connection for controlling the aforesaid high pressure valve, and latch operated means for holding both the aforesaid valves simultaneously in closed positions, the latch